Sept. 20, 1960  E. B. ETCHELLS  2,953,336
ENGINE MOUNTING SYSTEM
Filed Sept. 26, 1957  3 Sheets-Sheet 3
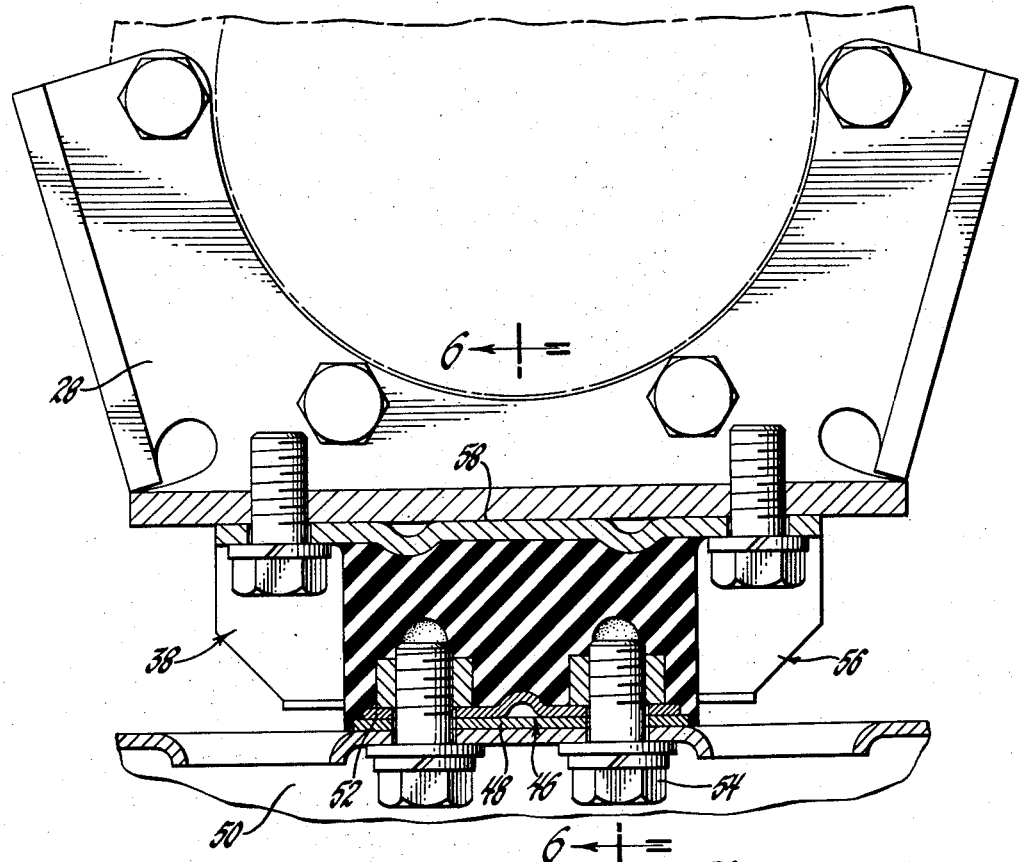
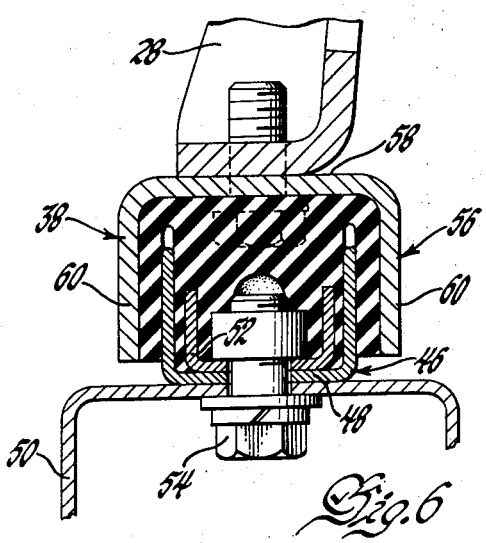
INVENTOR.
Eugene B. Etchells
BY
L. D. Burch
ATTORNEY United States Patent Office 2,953,336
Patented Sept. 20, 1960

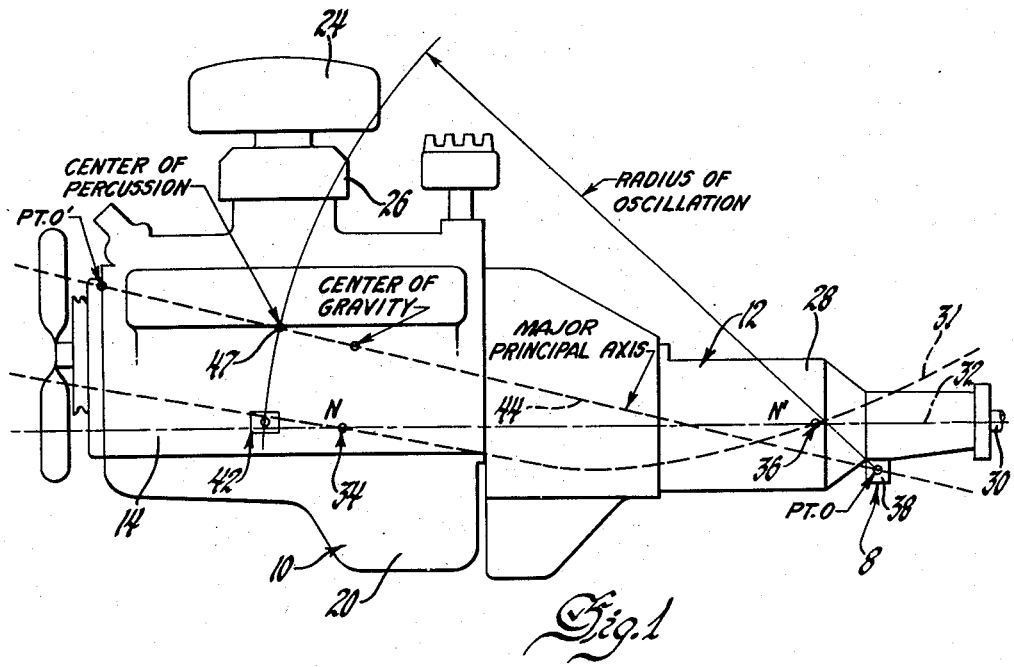
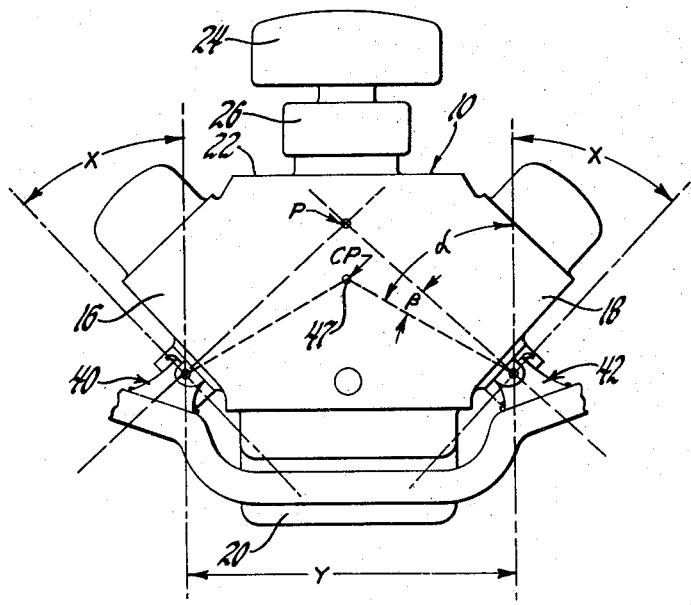

2,953,336

ENGINE MOUNTING SYSTEM

Eugene B. Etchells, Birmingham, Mich., assignor to General Motors Corporation, Detroit, Mich., a corporation of Delaware Filed Sept. 26, 1957, Ser. No. 686,395

4 Claims. (Cl. 248—9)

The present invention relates to engines and more particularly to means for resiliently supporting an internal combustion engine in an automotive vehicle.

The normal automotive vehicle employs an internal combustion engine mounted on the vehicle frame by a resilient mounting system adapted to absorb the engine vibration. These systems have been particularly effective in dampening the vibrations originating in the engine. However, in addition to such vibrations there are further road vibrations produced by the vehicle traveling on a road. These road vibrations are transmitted from the frame to the engine and cause the engine to vibrate relative to the frame.

It is now proposed to provide an engine mounting system which is not only simple and economical but is also very effective in reducing the engine noises and vibrations in the engine. This invention may be incorporated into a mounting system of the so-called three point variety in which a single resilient mounting is provided at the rear of the engine and transmission assembly and a pair of transversely spaced resilient mounts are provided at the front of the engine. Both the front and rear mounts include resilient elements which are located adjacent the vibratory nodal points of the engine and transmission assembly so that they will be subject to a minimum amount of vibration. The rear mounting is preferably located close to the major principal axis of the engine and transmission assembly while the front mounting means includes a pair of transversely spaced mounts that are disposed on opposite sides of the engine to react along lines intersecting on the major principal axis of the engine and transmission assembly. As a result the torque roll axis of the engine will be substantially coincident with the major principal axis of the engine thereby allowing the mountings to be loaded in shear to absorb the torque reaction of the engine and in compression to absorb the weight of the engine. In addition to the foregoing, it has been found advantageous for the lines of effective reaction of the front mounts to also intersect on the center of percussion as determined by the location of the rear mounting. When a body is struck at the center of percussion, there will be a minimum amount of vibrations produced in the body. Accordingly, if the front mountings react through the center of percussion, any road vibrations in the frame will react through the center of percussion. As a result, the mass of the engine will be effective to absorb and dampen the road vibrations transmitted from the vehicle frame to the engine.

In the three sheets of drawings:

Figure 1 is a side view of an engine schematically illustrating an engine mounting system embodying the present invention.

Figure 2 is an end view of the engine in Figure 1, schematically illustrating the present invention.

Figure 5 is a cross-sectional view of the rear engine mounting assembly.

Figure 6 is a cross-sectional view taken substantially along the planes of line 6—6 in Figure 5.

Figure 3:
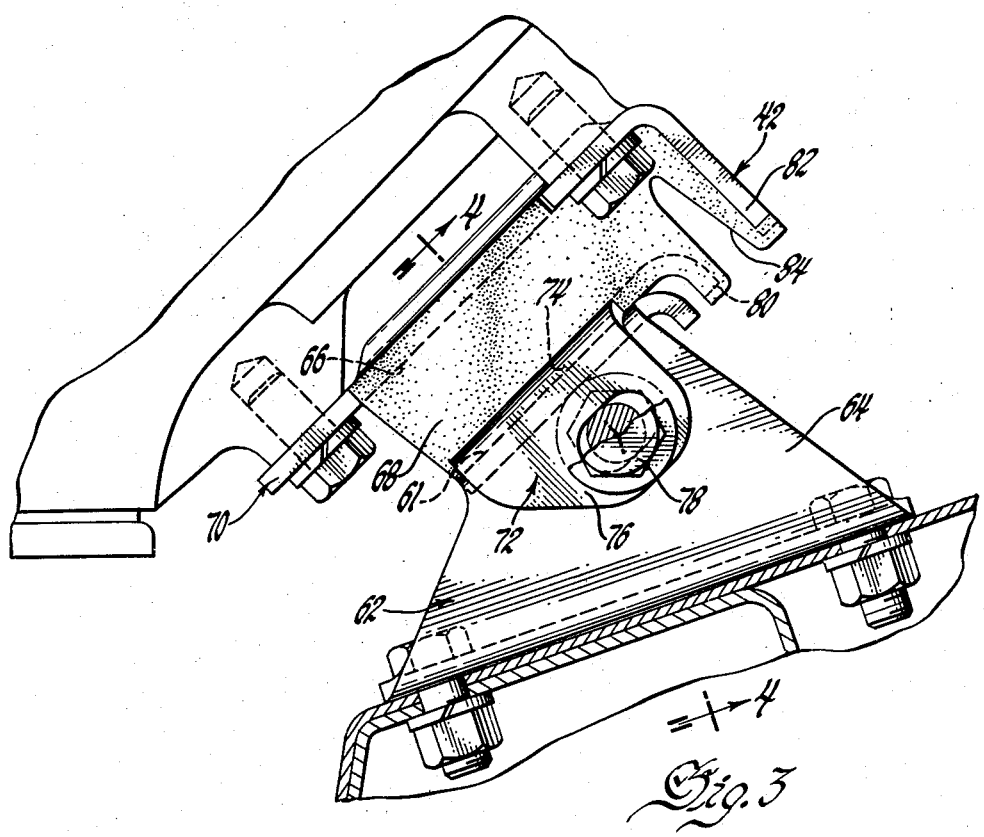
Figure 3 is an end view of one of the front engine mountings.
Figure 4:
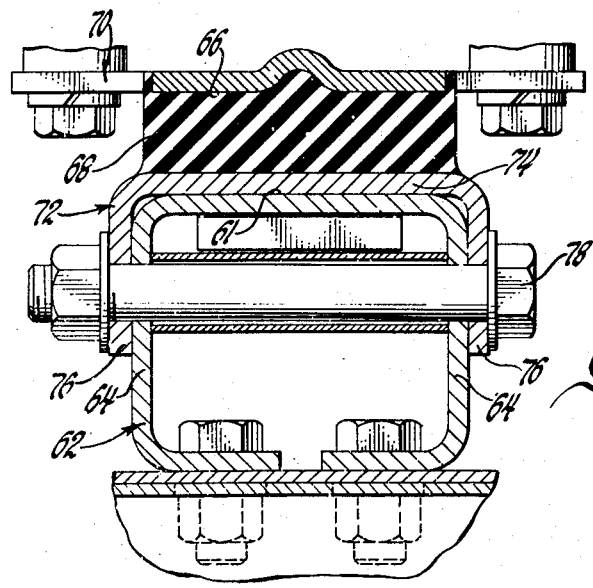
Figure 4 is a longitudinal cross-sectional view taken substantially along the planes of line 4—4 in Figure 3.

Although this invention may be adapted for use in a mounting system 8 in any type of engine 10, in the present instance it is particularly adapted to resiliently support an automotive engine and transmission assembly 12. This engine 10 is of the so-called V-type having a cylinder block 14 with a pair of angularly disposed banks 16 and 18 of cylinders. Each cylinder has a reciprocating piston therein that is drivingly connected to a crankshaft enclosed by a crankcase 20 provided on the bottom of the cylinder block 14. The explosive charge of air and fuel for the cylinders is supplied by an induction system 22 disposed between the two banks 16 and 18 of cylinders and including an air cleaner 24 and carburetor 26.

In order to convert the power of the engine 10 into a more useful form for driving an automotive vehicle, a transmission 28 may be rigidly attached to the rear end of the cylinder block 14. The transmission 28 is drivingly connected to the engine crankshaft and has a power output shaft 30 projecting from the rear end thereof for supplying power to drive a vehicle. It is, of course, apparent that the transmission 28 and engine 10 form a single rigid assembly 12 that will act substantially as a single body.

During operation of the engine, the reciprocating pistons, the explosive reactions thereon, the rotating crankshaft, and the movement of the various other masses in the engine 10 and transmission 28 will cause the assembly 12 to vibrate, the amount of vibration being represented by the displacement of the dotted line 31 from the base line 32. Although engine and transmission assemblies 12 of different designs will have different characteristics, a series of identical assemblies will have substantially identical characteristics, so that identical mountings may be used for all assemblies in the series. The vibrations in a typical automotive engine and transmission are represented by the line 31. It should be noted that this curve 31 crosses the zero line 32 at two different points 34 and 36 located between the extremities of the assembly 12. At these points the magnitude of lateral and/or vertical vibrations is substantially zero. The mounting system 8 includes a rear support 38 that is attached to the transmission 28 adjacent the vertical plane containing the rear nodal point 36 and a pair of front mountings 40 and 42 that are disposed on opposite sides of the engine 10 as close as possible to the vertical plane containing the front nodal point 34. By locating the mounts adjacent these nodal points 34 and 36, there will be very little vibration transmitted through the engine mounts.

The torque reactions of the engine 10 and transmission 28 will cause the assembly 12 to tend to rotate about a line known as the major principal axis 44. The rear mount 38 is preferably located on this axis 44. The rear mount preferably comprises a first channel member 46 having the base 48 thereof bolted directly to a cross member 50 on the vehicle frame. In addition, a second smaller channel member 52 may be nested inside of the first channel 46 and retained in position by the same bolts 54 that hold the first channel 46 on the cross member 50. A third channel member 56 is adapted to have the base 58 thereof bolted to the bottom of the transmission 28 so that the arms 60 thereof will project downwardly and embrace the two lower channels 46 and 52. The space between these channel members is filled with a resilient material such as a molded rubber member. This resilient member is preferably bonded onto the channel members 52 and 56 and has recessed slots provided to receive the first channel member 46. The upper ends of these slots preferably have spaces to allow movement of the member 56 in the resilient member. Thus the rear end of the engine and transmission assembly will be resiliently supported by the rear mount.

Since the front mounts, as a practical matter, cannot be located on the major principal axis 44, they are arranged so that the effective lines of reaction intersect as close as possible to the major principal axis 44. When the mounts are arranged in this manner, there will be a minimum amount of resultant vibrations reacted into the vehicle frame members and they will be effective to withstand the torque reactions of the engine.

To further increase the dampening actions on the vibrations of the engine, it is desirable for the effective lines of reaction of the front mountings 40 and 42 to intersect at the center of percussion 47 as determined by the rear mount. This is a theoretical point at which when a body is struck a percussive blow, there will be a minimum amount of vibration in the body. This center of percussion 47 may be determined by mathematical calculations or any other suitable means. However, the most convenient means is to suspend the engine and transmission assembly 12 by its rear mount 38 and allow the assembly 12 to swing freely. By observing the mass and period of the assembly, the radius of oscillation can be readily calculated by the application of the formula for a pendulum. As may be noted in standard physics texts, there are two types of pendulums. They are a simple pendulum wherein the entire mass is concentrated at a point and a compound pendulum wherein the mass is distributed over the pendulum length. The engine and transmission assembly 12 falls into the latter category. The formula for the period of oscillation of a simple pendulum is $$T = 2\pi \sqrt{\frac{L}{g}}$$

and the formula for the period of oscillation of a compound pendulum is $$T = 2\pi \sqrt{\frac{I}{Mgh}}$$

where L is the radius from the point of suspension to the center of the mass, I is the moment of inertia of the assembly about a transverse axis through the point of suspension, M is the mass of the body, g is acceleration due to gravity, and $h$ is the distance between the center of gravity and the point of suspension by equating these formulas it is seen that $$L = \frac{I}{Mh}$$

If the mass of the compound pendulum were to be concentrated at a point which is the distance L from the point of suspension, a simple pendulum would be provided which would have a period identical to that of the compound pendulum. This mass concentration point is called the center of oscillation and is coincident with the center of percussion. L therefore represents the radius of oscillation and may be determined for the assembly 12 since the values of I, M and $h$ are readily ascertainable for the assembly. The center of percussion will then be located on the principal axis 44 and spaced from the rear mount 38 by a distance equal to the radius of oscillation.

The two front mounts 40 and 42 are preferably substantially identical to each other except that they are symmetrical about the center line of the engine. However, it should be noted that they may be different in design and location, provided the reactions intersect at the center of percussion. Accordingly, only one mount 42 will be described. The mount 42 includes an inclined surface 61 either integral with the frame or as in the present instance, on the upper end of a pedestal 62 bolted directly onto the frame. This pedestal 62 raises the height of the mounting 42 considerably above the level of the frame. It includes a pair of substantially vertical parallel side walls 64 which are normal to the inclined surface 61. A complementary surface 66 is also provided on the cylinder block or on a projection therefrom so as to be parallel to and spaced from the surface 61 on the pedestal 62. The space between these two surfaces is filled by a resilient structure comprising a resilient block 68 of material such as rubber and a pair of metallic members 70 and 72 on the opposite sides thereof. The first metallic member 70 is bonded onto the top of the block 68 and is bolted directly to the cylinder block. The second metallic member 72 is bonded to the bottom of the block 68 and has a plane portion 74 which rests on the inclined surface 61 on the pedestal 62. In addition, a pair of ears 76 extend downwardly on the opposite sides of the pedestal 62 to be in intimate contact with the vertical walls 64. A single bolt 78 extends completely through the ears 76 and walls 64 so that the engine 10 may be lowered into position and secured in place by merely running the bolt 78 into position. This will keep the two plane surfaces 61 and 74 together and thus prevent any pivoting movement about the bolt 78. It will thus be seen that this resilient member 68 will be compressed so as to support the engine and at the same time will absorb any vibrations present at the mounting. If it is desired to vary the shear rate, a pair of parallel flanges 80 and 82 may be provided on the two metallic members 70 and 72 so that resilient material may extend therebetween. An inwardly opening crevice 84 may be provided to further regulate the shear rate. Thus excessive lateral movement of the two metallic plates will be restrained by compressing the resilient material between the two flanges.

Since the lines of reactions must pass through the center of percussion and principal axis, the angles for the inclined surfaces may be determined as illustrated in Figure 2. From the knowledge of the vertical rate desired on the front mountings, the geometry of the situation, and the ratio of stiffness of the front mount assembly (compression rate/shear rate), it is possible to compute the angle X so that these parts will be positioned such that their dynamic axes will intersect at CP. This is done by evaluating the following formula:

$$\tan \beta \times \tan (\alpha - B) = \frac{1}{k}$$

Where $K = \dfrac{\text{Compression rate}}{\text{Shear rate}}$

Although the present invention has been specifically described for use in a particular mounting system, it should be noted that it may be adapted to fit any desired engine and/or transmission assembly so as to employ the mass of the engine to deaden the transmission of vibrations from the assembly to the supporting structure as well as to absorb road shock from the chassis. As a practical matter it may not be possible to exactly satisfy all the exact requirements of the system. However, as illustrated in Figure 1, the mountings may be displaced slightly from the nodal points without a prohibitive effect, provided the reactions of the mountings pass through the major principal axis and the center of percussion.

What is claimed is:

1. A mounting system comprising an internal combustion engine having a torque roll axis and a principal axis substantially coincident therewith, a center of gravity and a center of percussion lying on said principal axis, one resilient support located on said principal axis at the center of oscillation for said center of percussion, and a pair of resilient supports disposed on opposite sides of the engine, each having effective lines of reaction intersecting said principal axis substantially at the center of percussion.

2. A mounting system comprising an internal combustion engine having a torque roll axis and a principal axis substantially coincident therewith, a center of percussion lying on said principal axis, a single resilient rear engine support determining the location of said center of percussion and located on said torque roll axis at the center of oscillation for said center of percussion, and a pair of resilient front engine supports disposed on opposite sides of said engine, each of said front resilient supports having effective lines of reaction intersecting said torque roll axis and said principal axis substantially at said center of percussion.

3. A mounting system comprising an internal combustion engine having a torque roll axis and a principal axis substantially coincident therewith, a first resilient engine support, a center of percussion determined by said engine support, front and rear nodal points of vibration and a vibration base line passing through said front and rear nodal points of vibration, said first engine support being positioned on said torque roll axis and at the center of oscillation for said center of percussion and adjacent one of said nodal points of vibration, second and third resilient engine supports disposed on opposite sides of said engine and adjacent the other of said nodal points and each having effective lines of reaction intersecting said torque roll axis and said principal axis substantially at said center of percussion.

4. The mounting system of claim 3, said first engine support being a rear engine support and said second and third engine supports being front engine supports.

References Cited in the file of this patent
UNITED STATES PATENTS

| | | |
|---|---|---|
| 1,872,259 | Eldridge | Aug. 16, 1932 |
| 2,044,714 | Trott | June 16, 1936 |
| 2,393,505 | Riesing | Jan. 22, 1946 |
| 2,738,985 | Paton | Mar. 20, 1956 |
| 2,864,573 | Olley | Dec. 16, 1958 |

FOREIGN PATENTS

| | | |
|---|---|---|
| 75,279 | Netherlands | July 15, 1954 |